Feb. 14, 1939.     E. C. HORTON     2,147,406
DIRECTION INDICATOR
Filed Aug. 4, 1937     2 Sheets-Sheet 1
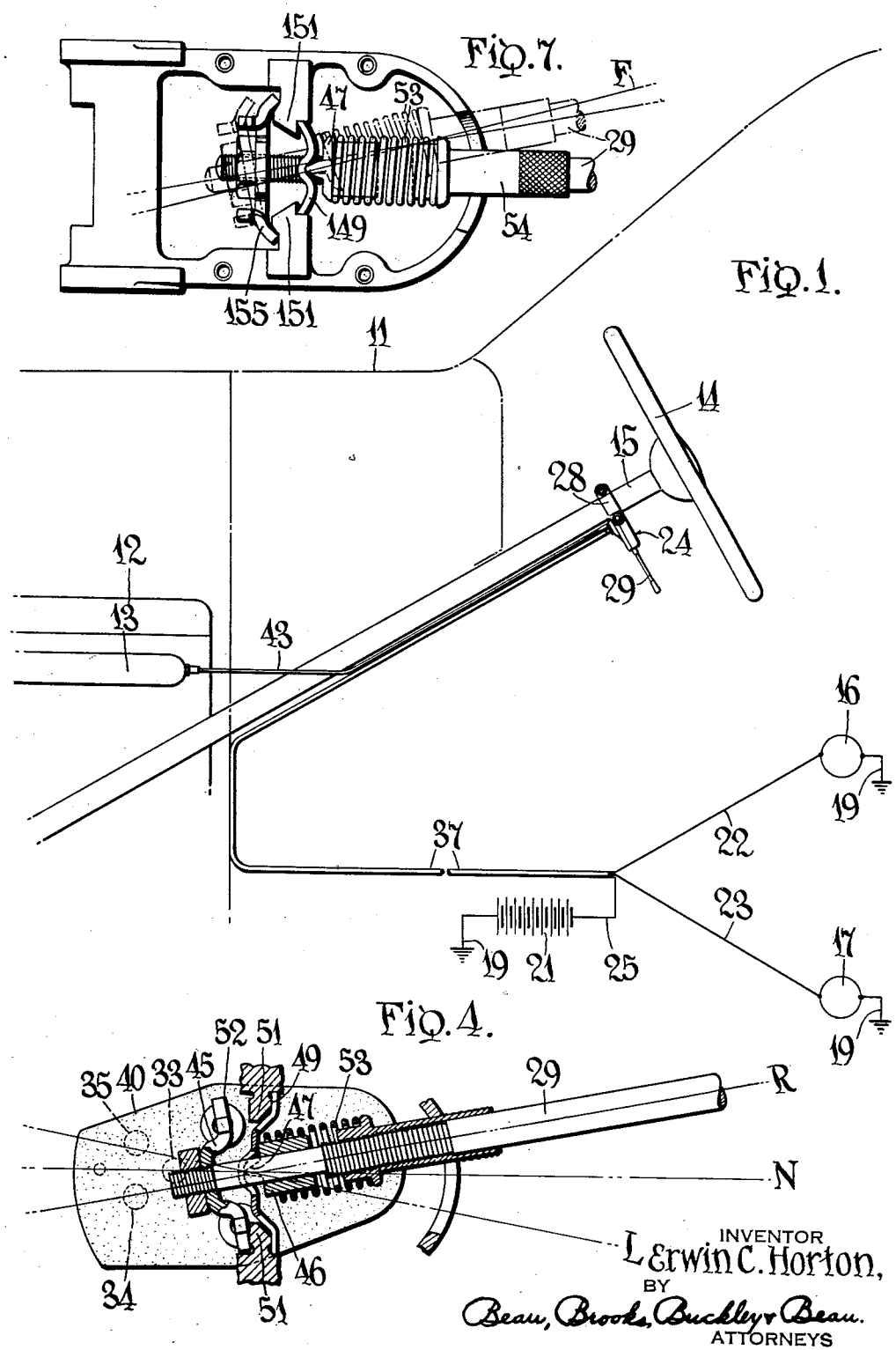
INVENTOR
Lerwin C. Horton,
BY
Beau, Brooks, Buckley & Beau.
ATTORNEYS Feb. 14, 1939. E. C. HORTON 2,147,406
DIRECTION INDICATOR
Filed Aug. 4, 1937 2 Sheets-Sheet 2
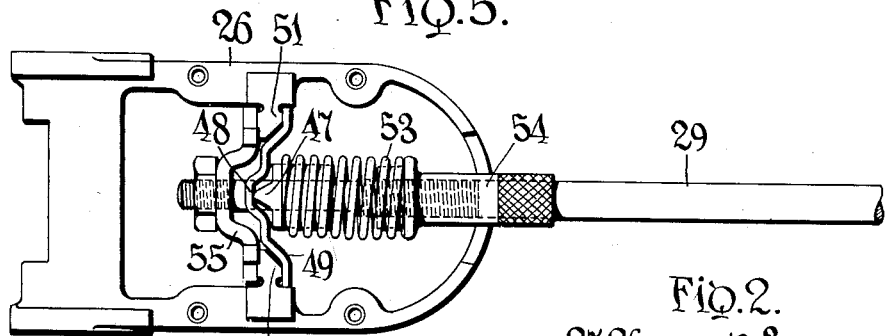
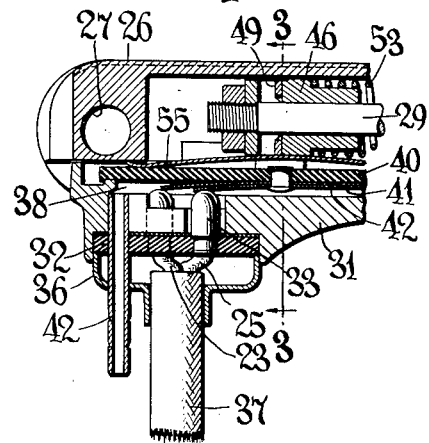
INVENTOR
Erwin C. Horton,
BY
Beau, Brooks, Buckley & Beau.
ATTORNEYS Patented Feb. 14, 1939

2,147,406

UNITED STATES PATENT OFFICE 2,147,406

DIRECTION INDICATOR

Erwin C. Horton, Hamburg, N. Y., assignor to Trico Products Corporation, Buffalo, N. Y.

Application August 4, 1937, Serial No. 157,368

10 Claims. (Cl. 177—329)

The present invention relates to signal apparatus especially adapted for a motor vehicle having an internal combustion engine for a power plant, and to an improved control unit for signals or other devices.

The invention comprehends a control unit whereby a signal apparatus or other device may be set into operation by manipulation of a control lever, the control unit causing the device to remain operating so long as the operating condition of the vehicle remains substantially the same, and, when it varies by a given degree, automatically causing the device to return to normal. The suction maintaining at the intake manifold of the vehicle engine may be utilized as the operating condition which results in the device remaining in operating condition, and a change in suction, as when the throttle valve is opened, may cause the device to return to normal. The control unit is adjustable to enable the return to normal at the point during changing operation which seems most desirable to the operator.

These and other objects and advantages, including those resulting from and residing in the formation, arrangement and combination of parts, will become apparent from the following description of the typical embodiment of the invention shown in the accompanying drawings, wherein:

Fig. 1 is a schematic elevation showing a signal system and control unit therefor applied to a motor vehicle in a manner contemplated by the invention;

Fig. 2 is a longitudinal vertical section taken through the forward portion of the control unit;

Fig. 3 is a transverse vertical section taken approximately along line 3—3 of Fig. 2;

Fig. 4 is a plan view of the movable parts of the device shown in Figs. 2 and 3;

Fig. 5 is an inverted plan view of the upper casing section of the device shown in Figs. 2 and 3; and Fig. 6 is a plan view showing the parts of the device which are beneath the upper casing section in disassembled relation and arranged in the order of disassembly; and Fig. 7 is a view similar to Fig. 5 but illustrating a modified or alternative construction.

As shown in Fig. 1, a motor vehicle 11 may be provided with an engine 12 having a fluid intake or intake manifold 13 and a steering gear including wheel 14 and column 15. Mounted on the vehicle, preferably in such manner as to be visible from the rear thereof, is a right turn indicator 16 and a left turn indicator 17. Indicators 16 and 17 are electrically energized, and may be grounded, as indicated at 19, with one terminal of a battery or other electrical source 21, and may be respectively connected by wires 22 and 23 to control unit 24 which is connected by wire 25 to the other terminal of electrical source 21. The control unit may be mounted on the steering column 15, its upper body section 26 having an opening 27 (Fig. 2) therethrough for passing a fastener for a clamp 28 that passes about the column. By manipulating handle 29, which extends from the control unit into convenient adjacency with the rim of the wheel 14, the operator of the vehicle may close a contact between wires 25 and 22 to effect display of signal 16, or close a contact between wires 25 and 23 to energize signal 17.

Secured by any suitable means to section 26 is lower body section 31 having a recess receiving an insulating support 32 for electrical contact point 33 to which wire 25 is connected, and for contact points 34 and 35, respectively, connected to wires 22 and 23. Closure plate 36 fitting around a conduit 37, through which wires 22, 23 and 25 extend, serves to retain support 32 in place. The contact points 33, 34 and 35 extend through openings in body section 26 into a recess formed in the upper face of the section and bounded by a ridge 39 having a plane upper surface. Seated upon the latter surface is a movable insulating plate 40 carrying two spring contact fingers, of which the shorter, 41, always engages contact point 33 and the longer, 42, may engage either or neither of points 34 and 35, depending upon the position of movement of the plate.

Extending into the recess 38 is a nipple 42 connected by a conduit 43 to manifold 13, so that air may be drawn from the recess 38 to partially evacuate the latter in accordance with the degree of suction or less-than-atmospheric pressure maintaining at the manifold.

Insulating plate 40 carries a pair of metallic cups 50 loosely receiving projections 44 depending from a cross-head 45 secured to the end of handle rod 29. Slidable on the rod is a block 46 having a knife edge 47 seating in a bearing recess 48 in a bridge plate 49, the ends of which rest upon lugs 51 that are formed on the upper body section. Plate 49 is apertured, as indicated at 52 to loosely pass the rod 29, and the block 46 is retained in contact with the plate by a coiled spring 53 which is backed by a member 54 threaded, and hence adjustable, upon rod 29. As shown in Fig. 5 the end of member 54 is knurled to facilitate adjustment. A leaf spring 55 is disposed between block 46 and plate 40 for retaining the latter seated upon ridge 39 when suction is insufficient for this purpose. Recesses 56 in the side edges of the leaf spring are engaged by projections 44 of cross-head 45, retaining the spring against displacement from the handle rod and plate 40 assembly.

The coiled spring 53 normally urges movement of block 46 toward cross-head 45, which causes the latter and bridge plate 49 to be pressed together, lugs 51 being clamped between them. Accordingly, the rod 29 will be held normally in the neutral position shown in Fig. 5, indicated by line N in Fig. 4. In this position spring contact 42 is between contact points 34 and 35 and touching neither, so that the circuits of both signals 16 and 17 are open.

Upon movement of handle 29 to the right, the position shown in Fig. 4 (the centre line of the handle being labeled R) the cross head 45 and plate 40 will be pivoted against the resistance of spring 53 which will be somewhat compressed. In this position contact finger 42 will contact point 34 thereby electrically closing contacts 33 and 34 and causing right turn signal 16 to be energized. Manual movement of handle rod 29 to the left (indicated by line L in Fig. 4) will cause left turn indicator 17 to become energized since contacts 33 and 35 will be electrically closed by contact fingers 41 and 42.

Upon manual setting in either direction, a signal will be automatically maintained so long as manifold suction remains high, as while the engine is operating with partially closed throttle, because then the pressure of the atmosphere upon the upper face of plate 40 so firmly presses the latter against seating ridge 39 that the plate is frictionally held against the urge of the spring 53 to return it to neutral position. However, as soon as the suction at the manifold, and hence in recess 38, is decreased, as for example when the throttle valve of the engine is suddenly opened as upon completion of a turn of the vehicle, the friction is lessened to an extent which enables the spring 53 to return the plate 40 to neutral position, releasing the signal.

The degree of compression of spring 53 may be adjusted by rotating member 54 and in this way the control unit may be so set that it will automatically release upon the suction decreasing to the particular degree at which the operator prefers such release to take place.

In the form of the invention illustrated in Fig. 7, the cross-head 155 (which is for the same purpose as cross-head 55 in Figs. 2 to 5, inclusive) carried by handle rod 29 normally has its ends engaged in recesses formed on lugs 151 that extend inwardly from the side walls of the upper body section. Engaged in recesses on the opposite faces of the lugs 151 are the ends of bridge plate 149, which, like plate 49, is apertured to loosely pass rod 29. The block 47, pressed by spring 53 which is backed by adjustable member 54, is urged toward cross-head 155, thereby causing the handle to remain in the neutral position shown by full lines in Fig. 7. Movement of the handle to the position shown in broken lines is resisted by the spring 53, since it results in the spring's compression.

It will be noted that the point of contact of parts 47 and 149 is disposed to one side (to the right in Fig. 7) of the fulcrum points of contact of cross-head 155 with lugs 151. This results in the line of pressure of spring 53 (the line indicated by broken line F) moving toward the effective one of said fulcrum points as the handle is moved to one side, and the ensuing decrease of effective lever arm compensates, at least to a considerable extent, for the increasing pressure of the spring, so that substantially uniform resistance to movement is provided throughout the entire stroke of the handle 29.

It will be understood that the devices herein illustrated and described are merely illustrative of the inventive principles involved and that such principles may be applied to other structures without departing from the scope and spirit of the invention.

What is claimed is:

1. In a control unit, cooperating with the fluid intake of a vehicle engine, a seat member, a movable control member having a part seating upon the seat member and slidably movable thereon, one of said members having a recess therein connectible to said fluid intake whereby, when the suction of the latter is great, said members will be held frictionally against relative movement, means for moving the movable member to a predetermined position when the suction is of lesser degree, and means for varying the effect of the last mentioned means for predetermining the degree of suction at which said last mentioned means will become effective.

2. In a control unit, cooperating with the fluid intake of a vehicle engine, a seat member, a movable control member having a part seating upon the seat member and slidably movable thereon, said movable member having associated therewith means for closing and opening an electrical circuit during movement thereof, one of said members having a connection to said fluid intake within the seat portion of the seat member whereby when the suction of the latter is of predetermined degree said movable member will be held in a set position away from a predetermined position, and means urging movement of the movable member to such predetermined position when the suction is of lesser degree.

3. In a control unit, a seat member, a movable control member having a part seating upon the seat member and slidably movable thereon, means for applying a variable pressure to said part for frictionally holding it stationary on the seat member, means for urging movement of the movable member to a predetermined position, and means for varying the effectiveness of the last mentioned means so as to predetermine the degree of said variable pressure at which the urging means will become effective over the holding means.

4. In a control unit, a seat member, a movable control member having a part seating upon the seat member and movable thereon, said movable member having associated therewith means for opening and closing an electrical circuit during movement thereof, means for applying a predetermined fluid pressure to said part for frictionally holding it stationary upon the seat member, and means moving the movable member to a predetermined position and effective when the fluid pressure drops below such predetermined degree.

5. In a control unit, a rod, a member having an aperture passing said rod and having a recess adjacent the aperture, a member embracing the rod and having a bearing engaging in said recess, spring means urging movement of the second member with respect to the rod toward said recess, and a part movable with said rod and removably engaging a stop disposed laterally from said recess and on one side thereof, whereby the spring means urge the rod to a position wherein said part is engaged against said stop.

6. In a control unit, a seat member, a movable control member having a part seating upon the seat member and slidable thereon, means for applying a predetermined pressure to said part for frictionally holding it stationary on the seat member, means for moving the movable member to a predetermined position in the absence of a predetermined pressure, and means for rendering said moving means more or less sensitive to varying pressures whereby the predetermined pressure aforesaid may be adjustably determined.

7. In a control unit, a rod, a member having a bearing, a member receiving the rod and engaging said bearing, spring means urging movement of the engaging member toward said bearing, and stops disposed laterally from said rod and on opposite sides thereof, and parts movable with said rod and each engageable against a respective stop for fulcruming thereon during rocking of the rod, said spring means urging the rod to a position wherein said parts are both engaged against said stops.

8. In a control unit, a body member having a recess with a ridge thereabout, an insulating member slidably movable upon said ridge and forming with said recess a chamber, means for creating a pressure differential between the inside and the outside of said chamber for at times holding said insulating member by friction against movement upon said ridge, electrical contact means within said recess, and other electrical contact means carried by said insulating member and in circuit making or breaking association with the first mentioned electrical contact means depending upon the position of movement of the insulating member with respect to the body member.

9. In a signalling system for a vehicle having a power plant, a signal, a signal control member having a movable part, a seat member upon which said movable part is slidable, means operable by said power plant for applying a variable pressure to said part for frictionally holding it stationary on the seat member, means for urging movement of the movable member to a predetermined position, and means for varying the effect of the last mentioned means for predetermining the degree of said variable pressure at which the urging means will become effective.

10. In a control unit, a body member and a movable control member slidable thereon, there being a recess between said members, spring means pressing the members together, and means for applying differential fluid pressures of varying degree to the face of the movable member at the recess and the opposite face of said movable member whereby the combined effect of said spring means and fluid pressures will be variable, and other spring means for moving the movable member to a predetermined position when said effect produces insufficient friction between said members to hold them against relative movement.

ERWIN C. HORTON.